United States Patent
Crim et al.

(10) Patent No.: US 7,184,977 B1
(45) Date of Patent: Feb. 27, 2007

(54) CLEC CONVERGENT BILLING SYSTEM

(75) Inventors: Sue Harkins Crim, Grapevine, TX (US); Thomas Michael Brill, Grapevine, TX (US); Patrick Steward Trigonoplos, Flower Mound, TX (US); David Lloyd Neyman, Tampa, FL (US); Rushika G. Mediwake, Flower Mound, TX (US)

(73) Assignee: GTE Communications Corporation, New York, NY (US)

( * ) Notice: Subject to any disclaimer, the term of this patent is extended or adjusted under 35 U.S.C. 154(b) by 0 days.

(21) Appl. No.: 09/002,276

(22) Filed: Dec. 31, 1997

(51) Int. Cl.
G06F 17/00 (2006.01)
(52) U.S. Cl. .......................... 705/34; 705/35
(58) Field of Classification Search ................ 705/26, 705/27, 10, 14, 30–40, 100
See application file for complete search history.

(56) References Cited

U.S. PATENT DOCUMENTS

| | | | |
|---|---|---|---|
| 4,071,697 A * | 1/1978 | Bushnell et al. | |
| 4,757,267 A * | 7/1988 | Riskin | |
| 4,799,156 A * | 1/1989 | Shavit et al. | 364/401 |
| 5,222,120 A * | 6/1993 | McLeod et al. | 379/88 |
| 5,909,492 A * | 6/1999 | Payne et al. | 380/24 |
| 5,991,310 A * | 11/1999 | Katko | 370/522 |

FOREIGN PATENT DOCUMENTS

EP 0 600 448 A2 * 6/1994

OTHER PUBLICATIONS

Morrow, Jeff, "A fair Share", Telephony, vol. 233, n. 10, pp. 100-104, Dialog File 15, AN 01502514; Sep. 1997.*

Flanagan, Patrick, "Putting It All Together: Has One-Stop Shopping Arived?", Telecommunications, vol. 31, n. 10, p. 34(4), Dialog File 148, AN 09820630, Oct. 1997.*

(Continued)

Primary Examiner—Frantzy Poinvil
(74) Attorney, Agent, or Firm—Leonard C. Suchyta, Esq.; Joseph R. Palmieri, Esq.; Finnegan, Henderson, Farabow et al

(57) ABSTRACT

A process is provided for a billing controller receives a request identifying a customer and indicating one of a plurality of providers for a selected product, converts a portion of the received request into a provisioning request based on the selected product; and provides the provisioning request to the provider. The billing controller also receives a request identifying a customer and including a bundle code indicating a plurality of providers for selected products, converts portions of the received request into provisioning requests based on the code, and provides the provisioning requests to the providers. The billing controller also receives usage data for a customer from a plurality of providers, converts the usage data from each provider into a standard usage data format based on predetermined billing rules, and stores the converted usage data linked to a customer record. The billing controller also accesses a stored customer record identifying a customer and including usage data and a plurality of codes, specifies a bill format from the codes, determines whether codes identify a selected bundle of products from at least two providers, and generates a bill including the usage data in the specified format. In generating the bill, the billing controller computes any discount based on the result of the determination, computes taxes for each of the products, and uses the computed discount and taxes in generating the bill.

19 Claims, 9 Drawing Sheets

OTHER PUBLICATIONS

Buisness Wire, "Saville Provides Time Warner Communications With Saville CBP Billing Platform", p. 9021071, Dialog File 148, AN 09700616, Sep. 1997.*

InfoWorld, pTW1, "Custom billing converges on industry: Increased competition for telcos means new services for customers",. Nov. 18, 1996, ISSN: 019-6649, Dialog file 16, Accession No. 04687776.*

InfoWorld, pTW1, Custom billing converges on industry: Increased competition for telcos means new services for customers, Nov. 18, 1996, ISSN: 019-6649, Dialog file 16, Accession No. 04687776.*

News Release, "Saville helps MTC Telacom Roll Out Web-Enabled Convargent Billing, " Jul. 10, 1998, <<http://www.Savillesys.com/4.html>> (2 Pages).

News Release, "Lucent Technologies and Saville Agree to Comarket End Billing and Customer Care System, " Mar. 10, 1997, <<http://www.lucent.com/press/0397/970310.nsa.html>> (3 pages).

News Release, "Saville and GTE Team to Help Emerging Telecommunications Providers Enter International Markets, " Oct. 21, 1996, <<http://www.savillesys.com/6.html>> (2 pages).

News Release, "Ameritech Selects Saville CBP as its Convergent Billing Platform, " Nov. 12, 1996, <<http://www.savillesys.com/8.html>> (2 pages).

News Release, "Saville's Next-Generation Billing Software Lets Telecommunications Providers Bring New Services to Market in Record Time, " Jun. 25, 1996, <<http://www.savillesys.com/5.htm>> (3 pages).

"Alliance Partners, " <<http://www.Savillesys.com/partners.html>> (accessed Mar. 30, 1997) (2 pages).

Bucholtz, Chris, "GTE Takes Saville Overseas, " Telephony, Oct. 28, 1996, (1 page).

* cited by examiner

CLEC CONVERGENT BILLING SYSTEM

BACKGROUND OF THE INVENTION

A. Field of the Invention

This invention generally relates to billing systems and, more particularly, to a convergent billing system for processing bills for Competitive Local Exchange Carriers.

B. Description of the Related Art

Telecommunications traffic such as voice and data typically originates at one end of a communications channel that is maintained either by a Local Exchange Carrier (LEC) or a Competitive Access Provider (CAP). If the destination of such traffic is within the area served by the LEC or CAP, then that carrier or the combination of carriers transports the traffic over their circuits to an intended destination. However, if the destination of such traffic is outside the service area of the LEC or CAP, then the carrier or combination of carriers transports the traffic to an Inter-Exchange Carrier (IXC). In the United States, AT&T, MCI and Sprint are present examples of such IXCs. The IXC transports the traffic over its network to another LEC or CAP serving the intended destination of such traffic.

Recent changes in the telecommunications laws in the United States have caused companies to introduce "Competitive Local Exchange Carriers" or "CLECs". Unlike the LECs that service traffic in a local exchange, CLECs do not necessarily service traffic. Instead, CLECs compete with the LECs by reselling the products and services of other companies. For example, CLECs resell telecommunications equipment such as mobile telephones and power adapters manufactured by other companies. CLECs also resell services such as voice mail, call forwarding, call waiting, caller ID, long distance service of the IXCs, local exchange service of existing or "incumbent" LECs (ILECs), Internet service of Internet Service Providers (ISPs), wireless service of Wireless Service Providers (WSPs) handling paging and/or cellular traffic, or video service.

Although a CLEC has the advantage of providing a wide variety of products and services, and combinations of those products and services, it does so at a significant cost. The CLEC must coordinate its provisioning and billing operation with the many suppliers to provide and bill customers for selected products and services. For example, a customer may select products and services of several different suppliers, including, a company like GTE for local exchange service (in those areas where GTE is an ILEC), AT&T for long distance service, GTEINS for Internet service, Bell Atlantic for wireless cellular service, and Bell South for a cellular phone and power adapter. Each supplier may require different "provisioning data" from the CLEC to provide products and services. Additionally, certain suppliers may have specific format requirements to process requests from the CLEC. Consequently, the CLEC must determine the type of product or service selected by the customer, and forward the appropriate provisioning data in the appropriate format to the selected supplier.

Service providers also have different formats for the usage data that records customer usage. Each usage data record includes, for example, information on local calls within the exchange serviced by the ILEC, also known as Intra-LATA communications, or long-distance calls that use an IXC to connect with a destination serviced by another LEC or CAP, also known as Inter-LATA communications. For example, MCI's usage data record has a format different from that used by AT&T. Similarly, New Jersey Bell (a LEC) has yet another format for usage data records. Consequently, the CLEC's billing operation must accommodate the various usage data record formats to generate a bill for the usage.

Saville Systems of Massachusetts offers a "Convergent Billing Platform" that enables LECs to process usage data of specific LECs and IXCs and to generate bills including that data. It is considered "convergent" in the sense that the platform generates a single bill for the LEC to charge a customer for (i) recurring charges, such as a fee for the local residential telephone line, (ii) LEC usage, such as charges for Intra-LATA calls, and (iii) IXC usage, such as charges for Inter-LATA calls.

Because Saville designed its platform for the processing requirements of long distance companies, whose needs are very different from the requirements of a CLEC, Saville's platform could not handle all billing requirements of a CLEC. It could not process customer requests for products and services of different LECs or other companies, including those companies providing services traditionally provided by the LEC, such as voice mail, call forwarding, call waiting, and caller ID. In other words, it was not possible with Saville's system for a customer to use different companies for each of these services. Instead, the customer had to use the LEC for these services.

Also, Saville's platform could not accommodate requests for products such as telephones and other telecommunications equipment. CLECs, however, are in a position to offer such products and, therefore, require the ability to bill customers for them.

Furthermore, Saville's platform was not capable of processing requests for packages of products and services and to offer discounts on such products and services based on the selection of a package(s). Because CLECs offer many products and services, which it typically purchases at a discount, it can package or bundle combinations of the products and services and offer the bundle to customers at a discount, as compared to the regular price for each product or service from a supplier. Accordingly, CLECs require a billing system that can accommodate product and service discounting of selected packages in a variety of configurations.

Consequently, CLECs were forced to develop their own customized billing system to handle these and other shortcomings of existing systems.

SUMMARY OF THE INVENTION

Accordingly, the present invention is directed to a method that substantially obviates one or more of the problems due to the limitations, shortcomings, and disadvantages of the related art.

In accordance with the present invention, as embodied and broadly described herein, a method for processing requests for products comprises the steps, performed by a processor, of receiving a request identifying a customer and indicating one of a plurality of providers for a selected product, converting a portion of the received request into a provisioning request based on the selected product, and providing the provisioning request to the provider.

In accordance with another aspect of the present invention, a method for processing requests for products comprises the steps, performed by a processor, of receiving a request identifying a customer and including a bundle code indicating a plurality of providers for selected products, converting portions of the received request into provisioning requests based on the bundle code, and providing the provisioning requests to the providers.

Additional aspects of the invention are disclosed and defined by the appended claims. It is to be understood that both the foregoing general description and the following detained description are exemplary and explanatory and are intended to provide further explanation of the invention as claimed.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by a conventional computer such as the model AS/400 manufactured by IBM Corporation. The architecture for and procedures to implement this invention, however, are not conventional, because they provide a standardized CLEC billing system that handles all billing requirements of a CLEC, including processing customer requests for (I) products and services of different providers, (ii) equipment, and (iii) product and service bundles, and offering discounts on such products and services based on the selection of a bundle(s).

Overview

A billing system implements the CLEC provisioning and billing operations in accordance with the present invention. A controller of the system receives customer requests for telecommunications products and services for which the CLEC bills the customer. For purposes of this disclosure, the term "product" will be used to refer to both products, such as equipment related to telecommunications services, and services, such as use of a network for communications, offered by CLECs.

The controller converts the requests as appropriate and forwards the converted requests to selected service providers, such as ILECs, IXCs, ISPs, WSPs, or other providers of telecommunications services such as voice mail, call forwarding, caller ID, or call waiting, that have contracted with the CLEC to provide products to the CLEC's customers.

The controller also generates bills to charge customers for selected products. The bills preferably reflect available discounts based on, for example, the selection of a specific bundle of products from multiple providers, specific usage values and appropriate taxes.

Billing System Architecture

Figure 1:
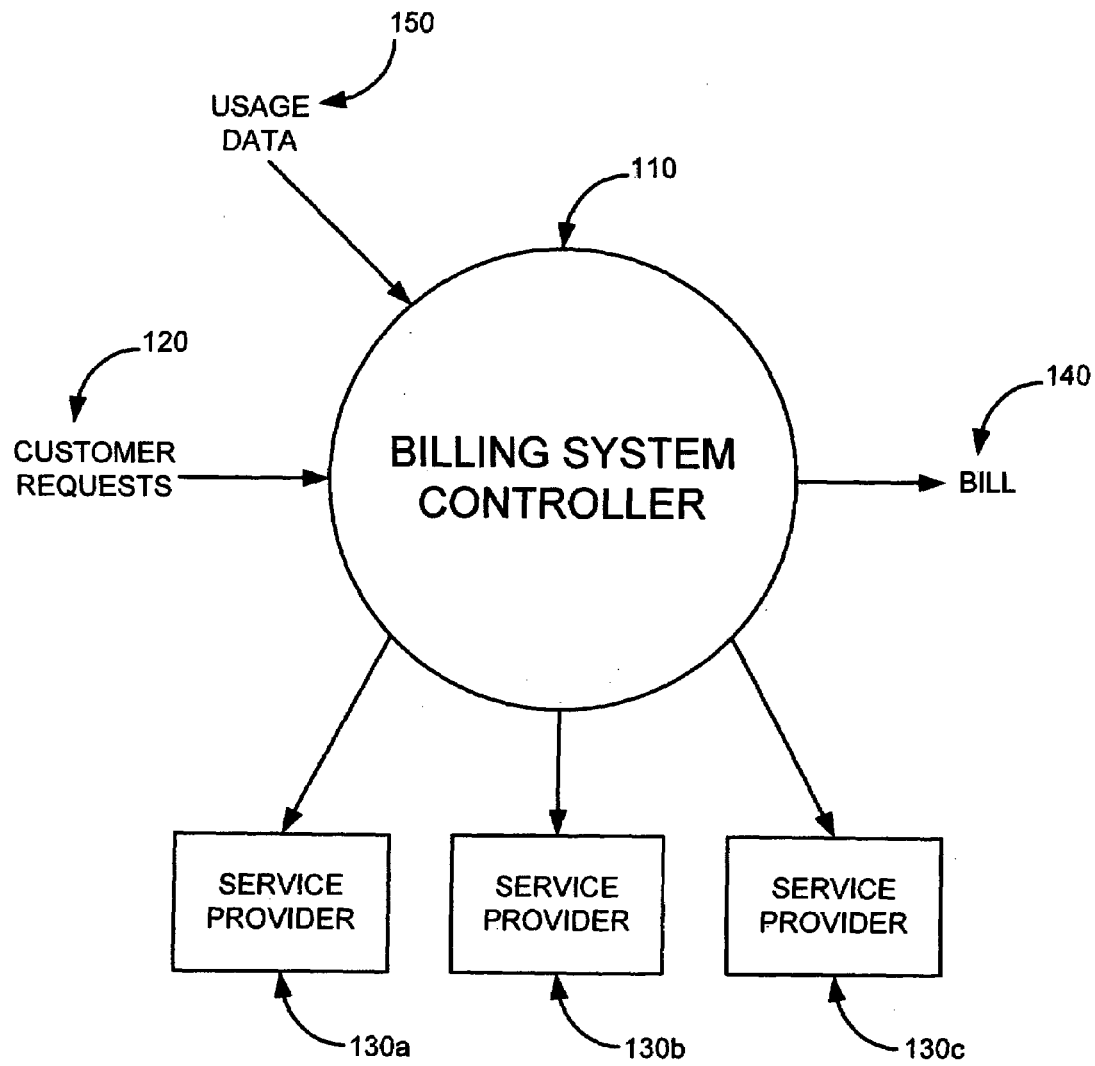
FIG. 1 is a block diagram of an architecture for a provisioning system according to an implementation of the present invention.

An architecture for a billing system 100 according to the present invention is shown in FIG. 1. Billing system 100 includes a controller 110 that receives customer requests 120, including data that identifies the customer and provisioning data that indicates selected products. The requests are preferably input using a graphical user interface operated by a representative of the CLEC. For example, controller 110 displays an input screen on a representative's terminal display connected to the computer, and the representative inputs data and commands via a terminal keyboard or other input device such as a mouse.

The CLEC representative may receive customer requests verbally over the telephone and input the customer identifying information, such as the customer's account number, name, address, and other similar information used to identify customers. The representative also inputs the customer's selected products.

Alternatively, other input schemes may be used to obtain the customer requests 120. For example, an Interactive Voice Response Unit (IVRU) may be programmed to receive customer requests over the telephone without the use of a CLEC representative. Furthermore, customers may send electronic requests to controller 110 using e-mail or some other electronic transmission scheme.

In a provisioning procedure, controller 110 provides portions of the received customer requests 120 to service providers 130*a*, 130*b*, and 130*c* to arrange for the delivery and provisioning of the selected products to the customer. FIG. 1 shows three such service providers, though many more can be used because a CLEC may contract with many service providers to service the CLEC's customers' needs for products. Controller 110 determines the appropriate portions of each customer request to forward to a service provider based on the selected product and the identity of the selected service provider.

In a billing procedure, controller 110 periodically generates bills 140 to charge its customers for selected products. There are at least two parts to each bill 140, i.e., recurring charges and usage charges. Recurring charges are for flat fee services that are billed on a periodic basis and not specifically tied to the customer's usage. For example, the fee for a telephone number (wired or wireless) is considered a recurring charge. Other services for which CLECs traditionally charge a recurring fee are voice mail, call forwarding, and call waiting.

In contrast, usage charges are tied to each customer's use of a network. For example, every time a customer receives or makes a telephone call using a cellular telephone he is charged a variable amount based on the time spent during the call. Note that local calls are typically covered by a recurring charge but long distance calls are subject to usage charges. In certain circumstances, however, an ILEC may charge for network usage for each call. For example, an ILEC may offer a base fee for a predetermined number of local calls within the ILEC's service area and incremental usage charges for each additional call over the number of calls covered by the base fee.

Controller 110 stores information related to each customer's recurring charges (which is based on each customer's service request) and periodically receives usage data 150 from each customer's selected service providers 130a, 130b, or 130c. Controller 110 compiles this information in the billing procedure, computes available discounts based on the customer's selection of a bundle of products, computes taxes based on the individual products, and generates the bill.

Billing System Controller

Figure 2:
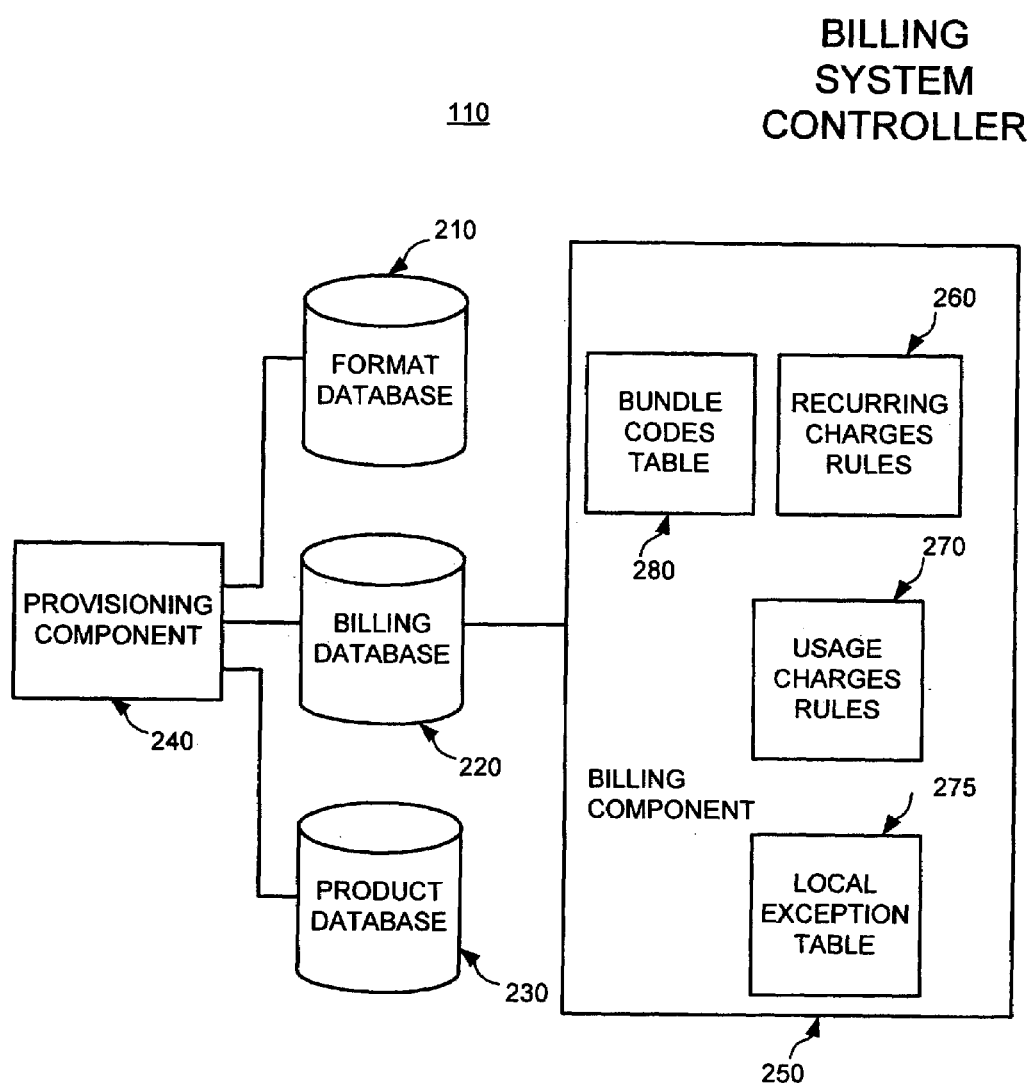
FIG. 2 is a block diagram of a system controller for the provisioning system of FIG. 1.
Figure 3:
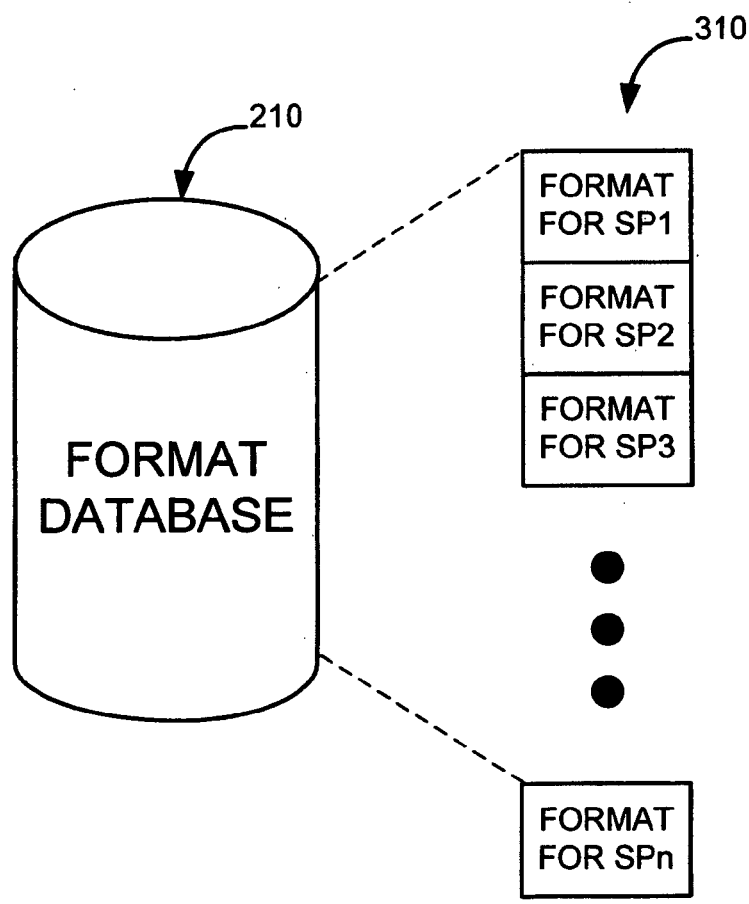
FIG. 3 is a block diagram of a format database of the system controller of FIG. 2 used to explain the content of the format database according to an implementation of the present invention.

FIG. 2 is a block diagram of the components of billing system controller 110. At the heart of controller 110 is a group of three databases, format database 210, billing database 220, and product database 230. A shown in FIG. 3, format database 210 preferably stores information related to the service providers (SP1, SP2, SP3, . . . SPn), for example, 130a, 130b, and 130c, that have contracted with the CLEC. The format information includes data on the preferred format required by each provider to process the CLEC's request to furnish products to the CLEC's customers.

Figure 4:
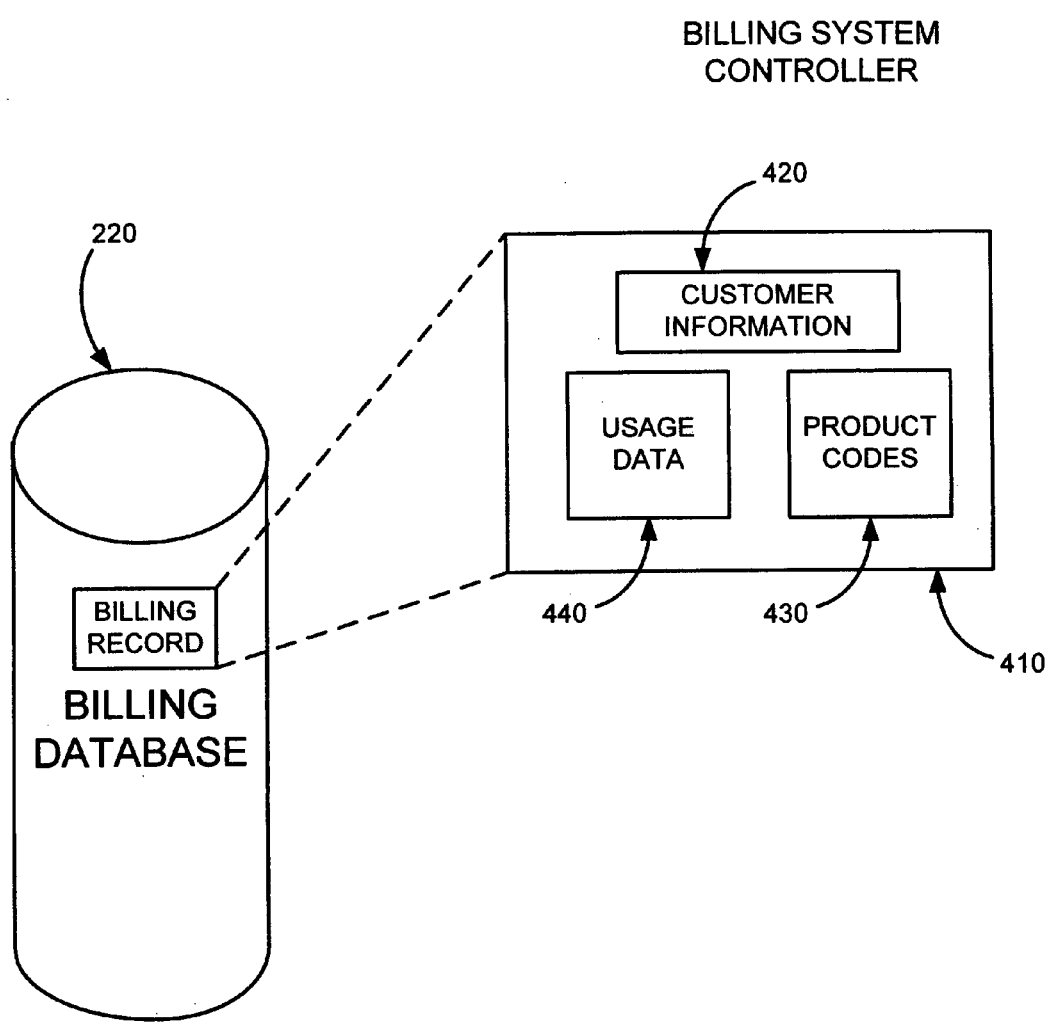
FIG. 4 is a block diagram of a database of the system controller of FIG. 2 used to explain the content of the database according to an implementation of the present invention.

Billing database 220 is the master database for controller 110. As shown in FIG. 4, billing database 220 preferably includes at least one billing record for each customer. Each billing record 410 includes customer information 420, including customer identifying information, and product codes 430 for selected products, and is linked to current usage data 440 or usage data since the last time billing controller 110 generated a bill for the customer. The product codes 430 also specify the recurring charges for applicable products. For example, when a customer leases a cellular phone, a lease fee would be specified as a recurring charge along with the product code for the lease of a cellular phone.

Figure 5:
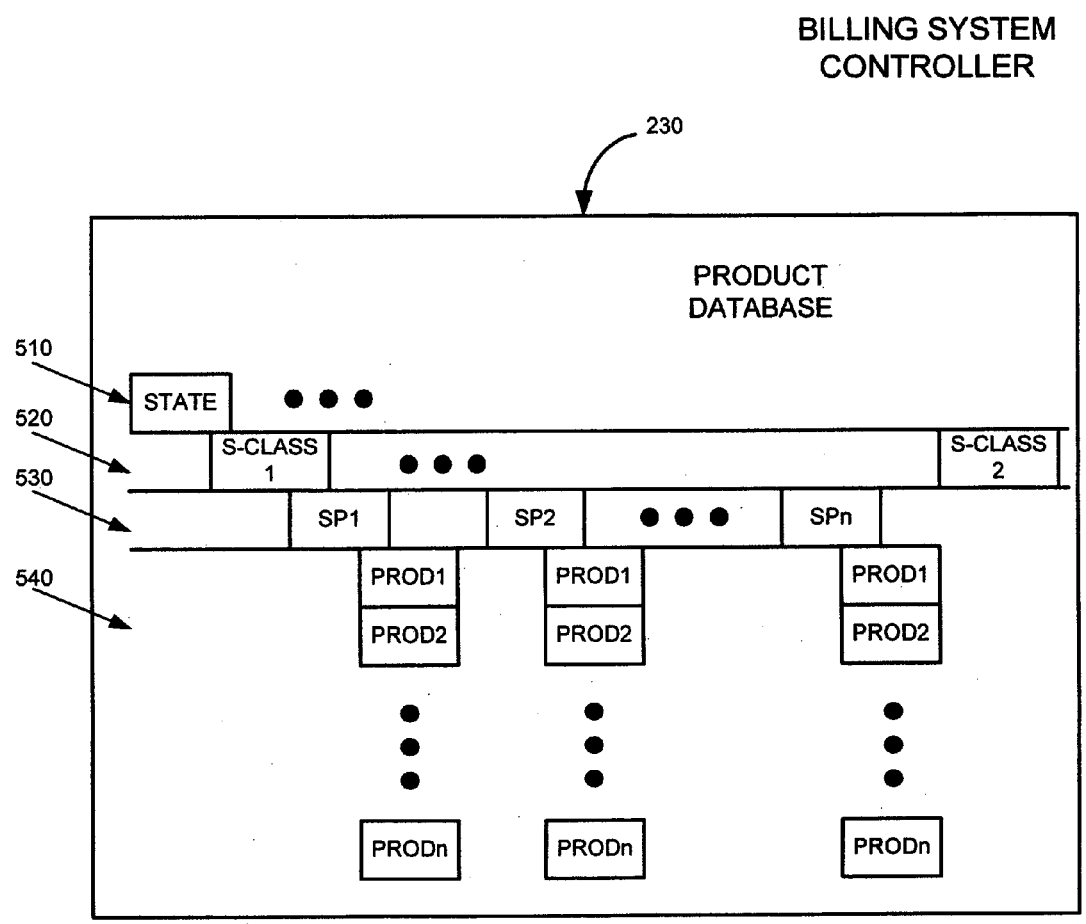
FIG. 5 is a block diagram of a product database of the system controller of FIG. 2 used to explain the content of the product database according to an implementation of the present invention.

Product database 230 includes an extensive table of the product codes for the products offered by the CLEC through its service providers, 130a, 130b, and 130c. As shown in FIG. 5, entries in product database 230 are classified by state 510 because a CLEC may service customers in more than one state and offer different products to customers in the different states. For each state 510, product database 230 stores multiple service classes ("S-CLASS") 520, which specifies the types of services offered by the CLEC in a particular state. For example, a CLEC may offer local exchange service, long distance service, Internet service, wireless service in one state and a different combination of services in another state.

Furthermore, a CLEC may contract with more than one service provider to provide each of the services in a class 520. Consequently, product database 230 reflects the multiple service providers (SP1, SP2, . . . SPn) 530 for each class 520. For example, a CLEC may offer cellular wireless service from AT&T and Bell Atlantic in the same state and paging wireless service of SKYTEL and PAGENET in the same or another state. Because certain service providers offer multiple types of products within a specific class, product database 230 reflects this by grouping multiple products (PROD 1, PROD2, . . . PRODn) 540 for each provider SP within a class S-CLASS. For example, GTE Mobilnet may offer cellular telephone equipment, voice mail for cellular phones, insurance on the equipment, a security package, and network product access kits, all of which would be grouped among the products offered by GTE with the cellular class.

As part of the product information, product database 230 also stores an amount to be charged to CLEC customers for each product.

Moreover, the CLEC may offer discounts based on a customer's selection of all services of a specific provider. For example, if the CLEC offers AT&T long distance service and AT&T cellular wireless service in the same state, and if the CLEC contracts with AT&T to buy both services from the CLEC's customers at a discounted rate, the CLEC can in turn pass on a portion or all of that discount to its customers that select both AT&T services.

A provisioning component 240, which preferably includes a software procedure executable by the computer, accesses the databases 210, 220, and 230 when providing certain provisioning data to selected service providers. In general, in response to receipt of a customer request, component 240 determines the service provider selected by the customer, accesses format database 210 to determine the appropriate format for provisioning data for that service provider, converts the provisioning data accordingly, and transmits the converted provisioning data to the selected service provider.

Provisioning component 240 accesses billing database 220 to store or update a record for the customer that reflects the requested provisioning of products and/or services.

Provisioning component 240 also accesses product database 230 during the provisioning process. For example, component 240 refers to database 230 to confirm the availability of a selected product or service because not all services may be available in all locations in which the CLEC operates. Additionally, not all service providers offer all of the various types of services; for example, one service provider may offer paging service in all states, but it only offers wired network service in several states. Moreover, product database 230 is used to add to each billing record the customer's recurring charges for selected products.

A billing component 250, which preferably includes a software procedure executable by the computer, accesses database 220 to generate bills to charge customers for products offered by the CLEC. In general, on a periodic basis, for example, monthly, billing component 250 accesses a billing record 410 of billing database 220 for a customer to obtain the stored customer information 420, usage data 440, and products codes 430, including recurring charges.

To compete with other CLECs and ILECs, CLECs typically discount products. Accordingly, the billing process computes the appropriate discounts to be passed on to the CLEC's customers. For this computation, billing component 250 uses a set of rules 260 applicable to computing an appropriate discount for recurring charges, a set of rules 270 applicable to computing an appropriate discount for usage charges, a local exceptions table 275, and a bundle codes table 280. For example, a customer who selected AT&T long distance service and AT&T cellular wireless service may be entitled to discount on recurring and usage charges for both. The customer's billing record identifies the product codes 430 for both services, and the rules 260 and 270 are consulted to determine the discount.

Similarly, the CLEC offers bundles of products at a discount, and billing component 250 may use bundle codes table 280 to compute the appropriate discount. For example, the CLEC may offer the following bundles:

(1) Residential Line
    Unlimited Local Calls
    Special Long Distance Rate
    Basic Cellular Service
    Caller ID
    Calling Card Wiring Maintenance
(2) Residential Line
  Unlimited Local Calls
  Special Long Distance Rate
  Caller ID
  Wiring Maintenance
  Telephone Directory
(3) Residential Line
  Unlimited Local Calls
  Special Long Distance Rate
  Internet Service Each bundle is assigned a code; for example, bundle (1) may be assigned "B1", bundle (2) may be assigned "B2", and bundle (3) may be assigned "B3". If a bundle code is included in a customer's billing record, then billing component 250 computes the discount for the selected bundle based on a predetermined factor specified in bundle codes table 280. If, however, a bundle code is not present, then no such bundle discount is computed.

Provisioning Procedure

Figure 6:
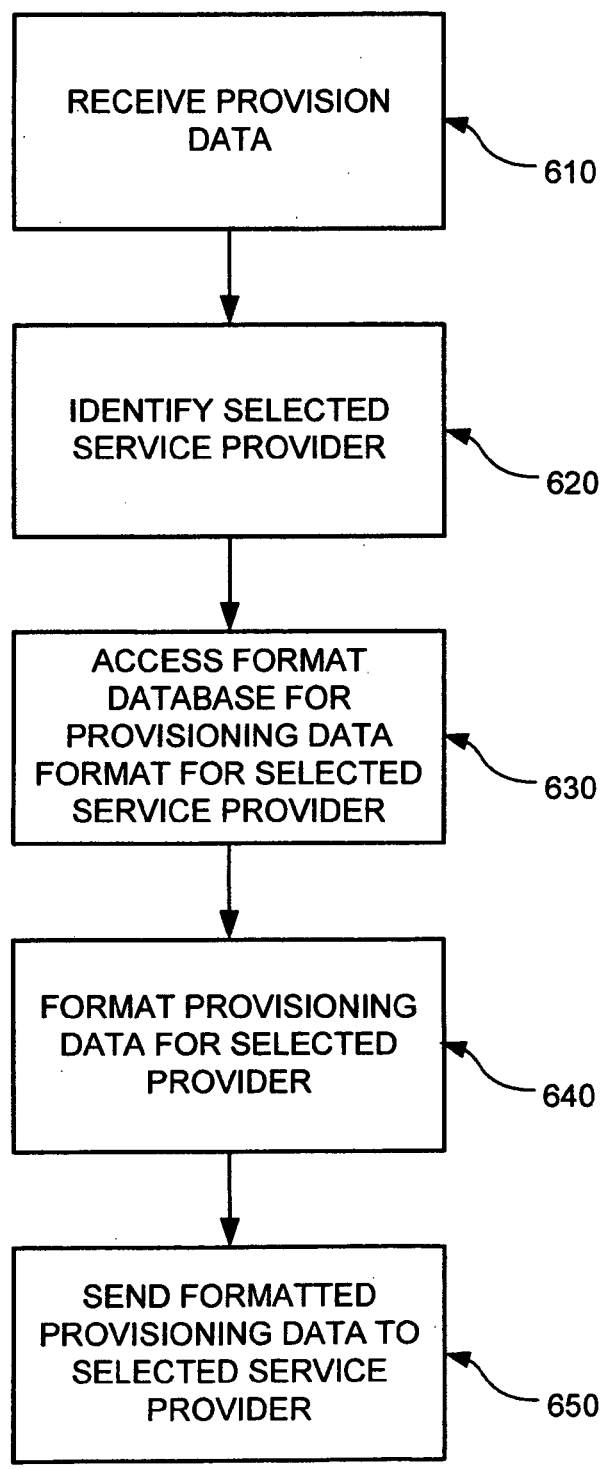
FIG. 6 is a flow diagram of the preferred steps of a provisioning procedure performed by the provisioning component of FIG. 2.

FIG. 6 is a flow chart of the steps of the provisioning component's provisioning procedure 600. First, component 240 receives provisioning data from the customer's request that details the customer's selected products (step 610). Provisioning component 240 identifies the customer's selected service provider from the provisioning data (step 620), and accesses format database 210 for a provisioning data format for that provider (step 630). For example, there is a form used by ILECs for the provisioning of local exchange service, and there is another form used by IXC for provisioning long distance service. Additionally, providers have specific forms for other products, and the CLEC's billing system accommodates each provider's format requirements.

Provisioning component 240 then formats the provisioning data from the customer's request in the appropriate format for the selected service provider (step 640), and sends the formatted provisioning data to the selected service provider (step 650). Preferably, provisioning component 240 transmits the formatted provisioning data using an electronic means such as e-mail or facsimile. If, however, such an electronic means is not available, provisioning component 240 may print a document in the appropriate format for the CLEC to then use another means, such as courier service, for sending it to the provider.

Provisioning component 240 performs this provisioning procedure 600 for each product and service selected by the customer.

Billing Procedure

Figure 7:
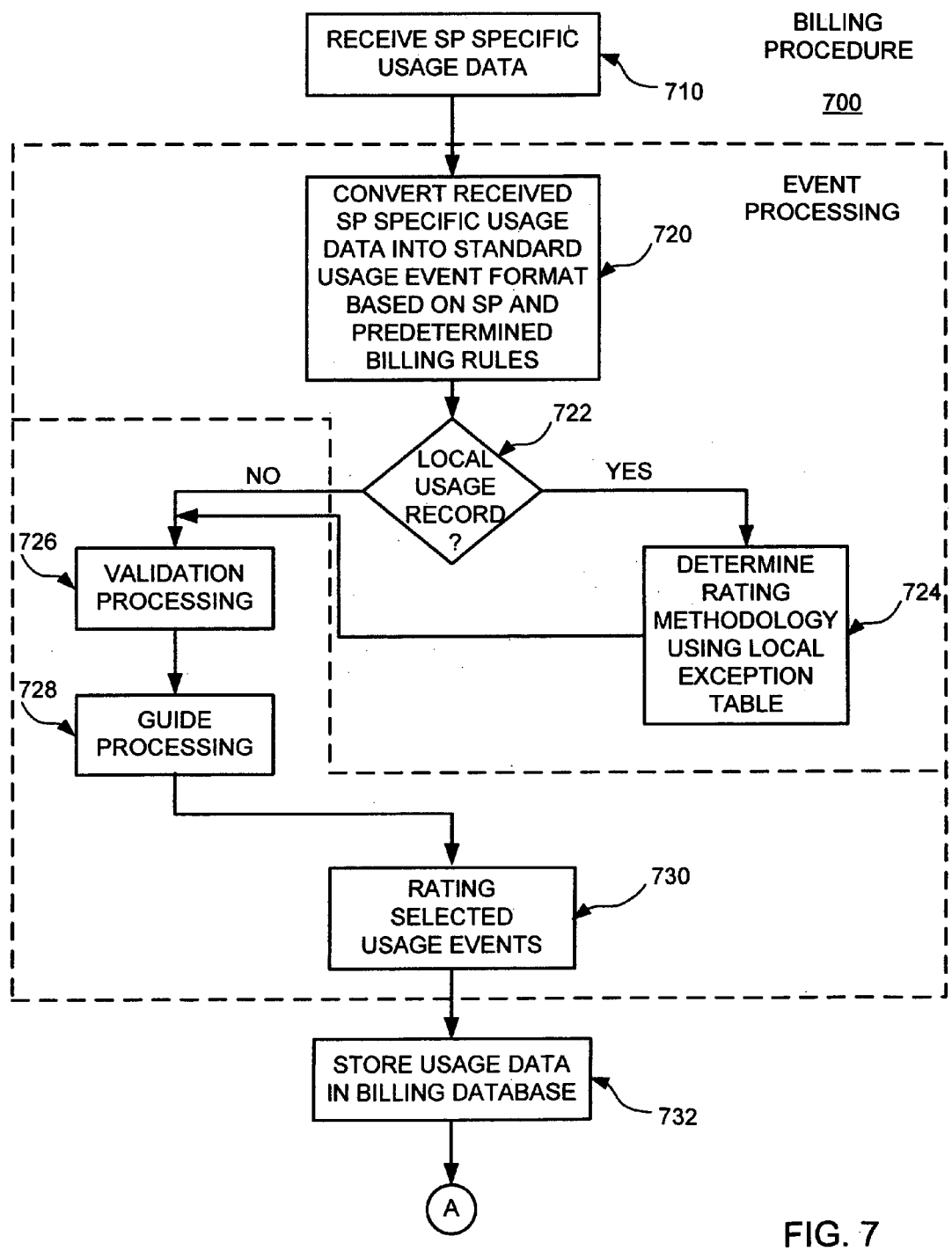
FIGS. 7 and 8 are a flow diagram of the steps of a procedure performed by the system controller of FIG. 2.
Figure 8:
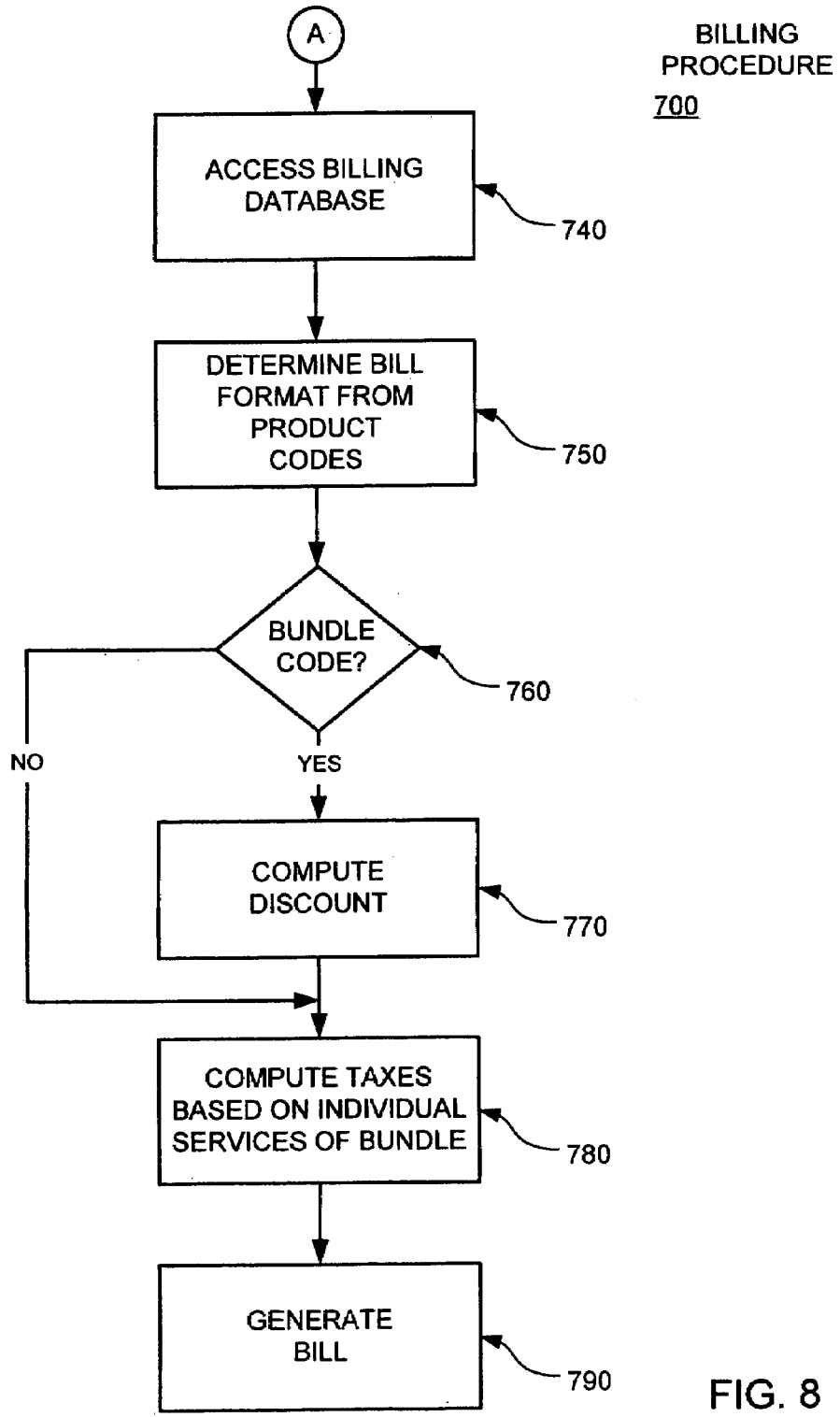

FIGS. 7 and 8 are a flow chart of the steps of the billing component's billing procedure 700. Billing component 250 regularly receives usage data from certain service providers. The usage data may come on a daily, or weekly basis, or in accordance with some other schedule. Service providers may also provide usage data to billing component 250 on a use basis, i.e., after each use of a network.

Initially, billing component 250 receives usage data from a service provider (step 710). Event processing then begins, for each record of usage data, billing component 250 converts the record data into a standard format for billing database 220 based on the identity of the provider and certain predetermined billing rules (step 720). If the record currently being processed relates to a local usage (i.e., not a long distance call) (step 722), then component 250 determines the appropriate rating methodology for that record with reference to the local exception table 275 (step 724). Because some customer plans (and local regulations) provide for different rates for local usage, component 250 must identify the appropriate rate for each usage record. Some records may be straight time where the time for the call is simply multiplied by a amount to determine the cost of the call. Other local calls may be free, depending on the appropriate rating methodology.

If the record is not one for local usage (step 722), or after determining the rating methodology for a local usage record (step 724), billing component 250 performs validation and guide processing (steps 726 and 728). During validation processing (step 726), component 250 verifies the record's contents. Each record must contain certain predetermined types of information. During guide processing, component 250 "guides" the record against the billing database to verify that the database contains a billing record for a customer corresponding to the usage record. Then, the record is rated based on information from the billing database and, if appropriate, the rating methodology from step 724 (step 730).

Finally, after all usage records are processed, the converted, processed usage records are stored in billing database 220 (step 730). Because each provider has its own format for usage data, the CLEC's billing component 250 includes billing rules that dictate how billing component 250 should convert usage data from each provider for storage in billing database 220. Steps 710 to 732 are repeatedly performed for all usage data from each provider that billing component 250 receives during a predetermined period.

Billing procedure 700 continues in FIG. 8. When generating bills, billing component 250 accesses billing database 740 for each customer record (step 740), and determines the bill format from the product codes (step 750). The product codes in the customer's record specifies the customer's selected classes of service (e.g., local exchange service, wireless cellular service, and long distance service), and this information is used to build the format for a bill. For example, the bill may have charges for products of each class of service on a separate page.

If the record indicates a bundle code (step 760), then billing component 250 computes a discount for the selected bundle using the discount rules discussed above (step 770). Otherwise, billing component 250 does not compute a discount.

Billing component 250 then computes the taxes, including, if appropriate, federal, state, and local taxes, based on the individual products without regard to the computed discount (step 780). Finally, billing component 250 generates a bill for the customer. The process of steps 740 to 790 is repeated for each customer record in billing database 220.

Alternative Billing System Architecture

Figure 9:
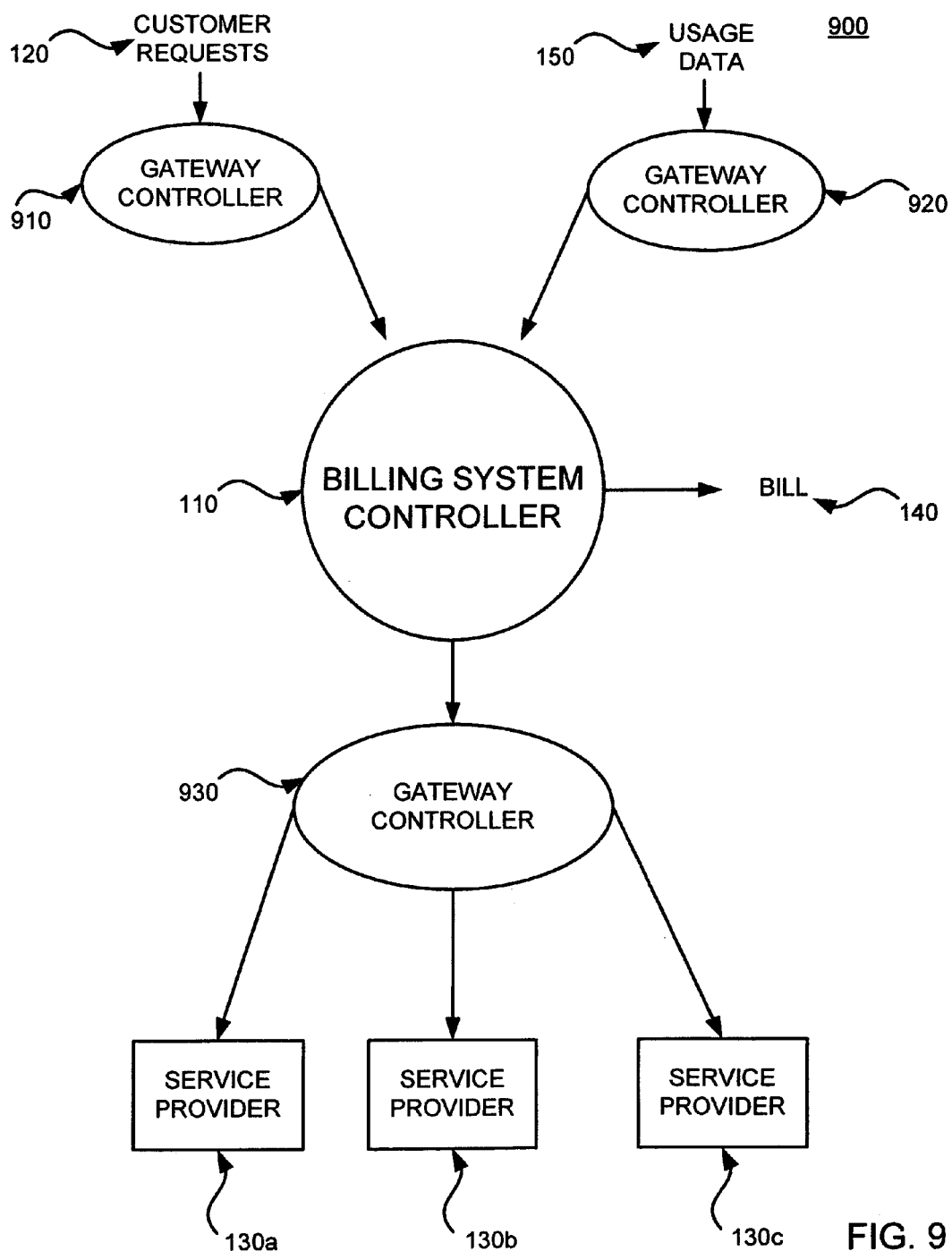
FIG. 9 is a block diagram of a provisioning system according to another implementation of the present invention.

FIG. 9 shows an alternative architecture for a billing system 900 according to the present invention. Unlike billing system 100, billing system 900 has additional gateway controllers 910, 920, and 930, which include software executable by the computer to perform a number of the conversion processes explained above with reference to billing system 100. In this architecture, gateway controller 910 converts customer requests into a standard format for processing by billing system controller 110, and gateway controller 930 receives a standard format form with provisioning data that it converts into the appropriate format for each service provider 130 based on the selected product. Similarly, gateway controller 920 converts usage data 150 from each service provider 130 into a standard format for processing by billing system controller 110.

Consequently, the software of provisioning and billing components 240 and 250 of billing system controller 110 in system 900 does not require customization for each new service provider added to the CLEC's list of providers. Instead, the components no longer need to perform the conversion processes from a standard to provider-specific format and vice-versa. Because gateway controllers 910, 920, and 930 perform the conversion processes, they may require modification for the CLEC's billing system to handle new providers.

CONCLUSION

In accordance with the present invention a standardized CLEC billing system is provided with the capability to handle all billing requirements of a CLEC. The billing system processes customer requests for products of different providers. The system processes requests for telecommunications equipment. It also accommodates product and service bundling, which permits the CLEC to offer discounts on such products based on the selection of a bundle(s).

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

We claim:

1. A method for processing requests for products comprising the steps, performed by a processor, of:
   storing in a database a set of bundle codes, each bundle code indicating at least two products offered by at least two different providers;
   receiving a request identifying a customer and including a bundle code;
   converting a portion of the received request into at least one specifically-formatted provisioning request for each provider based on the received bundle code; and
   providing the provisioning requests to the providers to initiate a product supply process by each provider.

2. The method of claim 1, wherein the converting step includes the substep of:
   deciphering the bundle code to identify the providers for the products.

3. The method of claim 2, wherein the deciphering step includes the substep of
   selecting product codes corresponding to the received bundle code from a stored table.

4. The method of claim 1, wherein the step of providing the provisioning request to the provider includes the substep of
   storing information from the received request as a customer record.

5. The method of claim 1, wherein the step of providing the provisioning requests to the providers includes the substep of
   determining a means for providing each of the provisioning requests to the providers.

6. The method of claim 5, wherein the step of providing the provisioning requests to the providers includes the substep of
   electronically transmitting or physically delivering the provisioning requests to the providers based on the determination.

7. A controller for processing requests for products comprising:
   a database configured to store a set of bundle codes, each bundle code indicating at least two different products offered by at least two different providers;
   a receiver configured to receive a request identifying a customer and including a bundle code;
   a converter configured to convert a portion of the received request into at least one specifically-formatted provisioning request for each provider based on the received bundle code; and
   a component configured to provide the provisioning requests to the providers to initiate a product supply process by each provider.

8. The controller of claim 7, wherein the converter includes:
   a decoder configured to decode the bundle code to identify the providers for the products.

9. The controller of claim 8, wherein the decoder includes:
   means for selecting product codes corresponding to the received bundle code from a stored table.

10. The controller of claim 7, wherein the component configured to provide the provisioning requests to the providers includes:
    storage configured to store information from the received request as a customer record.

11. The controller of claim 7, wherein the component configured to provide the provisioning requests to the providers includes:
    a component configured to determine a means for providing each of the provisioning requests to the providers.

12. The controller of claim 7, wherein the component configured to provide the provisioning requests to the providers includes:
    a transmitter configured to electronically transmit the provisioning requests to the providers.

13. A computer program product containing instructions for causing a data processor to perform a method, the method comprising:
    storing in a database a set of bundle codes, each bundle code indicating at least two products offered by at least two different providers;
    receiving a request identifying a customer and including a bundle code;
    converting a portion of the received request into at least one specifically-formatted provisioning request for each provider based on the received bundle code; and
    providing the provisioning requests to the providers to initiate a product supply process by each provider.

14. The computer program product of claim 13, wherein converting includes:
    deciphering the bundle code to identify the providers for the products.

15. The computer program product of claim 14, wherein deciphering includes:
    selecting product codes corresponding to the received bundle code from a stored table.

16. The computer program product of claim 13, wherein provisioning includes:
    storing information from the received request as a customer record.

17. The computer program product of claim 13, wherein provisioning includes:

determining a means for providing each of the provisioning requests to the providers.

18. The computer program product of claim 13, wherein provisioning includes:
electronically transmitting the provisioning requests to the providers based on the determination.

19. A data processing system for processing requests for products comprising:
a request-processing gateway controller, connected to a central controller, configured to receive customer requests for at least two different products offered by at least two different providers; and
a service-provider gateway controller, connected to the central controller, configured to receive the customer requests via the central controller and to distribute specifically-formatted provisioning requests to each of the providers to initiate a product supply process by each of the providers.

* * * * *